Figure 1:
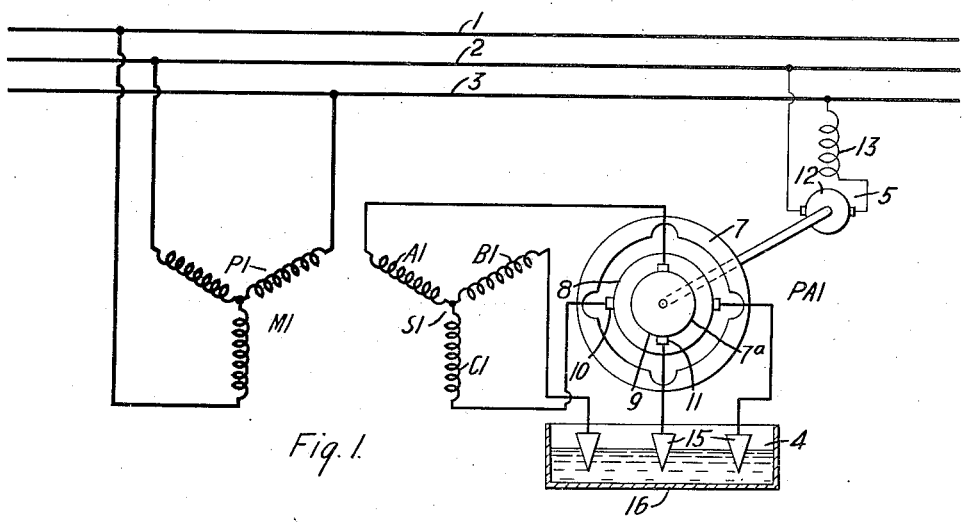

R. E. HELLMUND.
SYSTEM OF CONTROL.
APPLICATION FILED SEPT. 9, 1915.

1,329,243.

Patented Jan. 27, 1920.

WITNESSES:
Fred A. Lind
W. P. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,329,243.  Specification of Letters Patent.  Patented Jan. 27, 1920.

Application filed September 9, 1915. Serial No. 49,754.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control for dynamo-electric machines, and it has special reference to phase-advancing means for regulating the operation of polyphase induction motors or systems of distribution.

One of the objects of my invention is to simplify and improve the arrangement of circuit connections and mode of operation of systems of the above-indicated character, and particularly to provide adequate means for effecting power factor compensations of a three-phase induction motor by means of adding corrective voltages to only two of the phases thereof.

In a more specific aspect, it is an object of my invention to provide a phase-regulating system, of the general class referred to, which shall embody a single dynamo-electric machine having two separate and distinct armature windings that are connected in series circuit between two of the secondary phase windings of the induction motor to be regulated and the polyphase rheostatic device, by means of which the operation of the motor is governed, whereby the phase-advancing means may operate to effect power-factor compensations, irrespective of the condition of operation of the rheostatic device.

In the prior art, as represented by my copending application, Serial No. 49,753, filed of even date herewith, Patented Nov, 19, 1918, No. 1,285,161, is disclosed a phase-regulating system which permits of the utilization of the phase-advancer at the same time that the polyphase interconnected rheostatic device is employed to govern the acceleration of the induction motor to be regulated. Moreover, means for regulating the phase position and power factor of an induction motor having three-phase secondary windings is set forth. However, in this system, the phase-advancing means is adapted to introduce an out-of-phase corrective voltage in each of the phases or legs of the motor secondary windings. Such an arrangement is necessarily complicated and expensive.

I propose, therefore, to accomplish the same general results in improving the operating power factors of the induction motor to be regulated by means of relatively simple and inexpensive apparatus which shall function to introduce correcting voltages in only two of the legs or phases of the induction motor.

Figure 2:
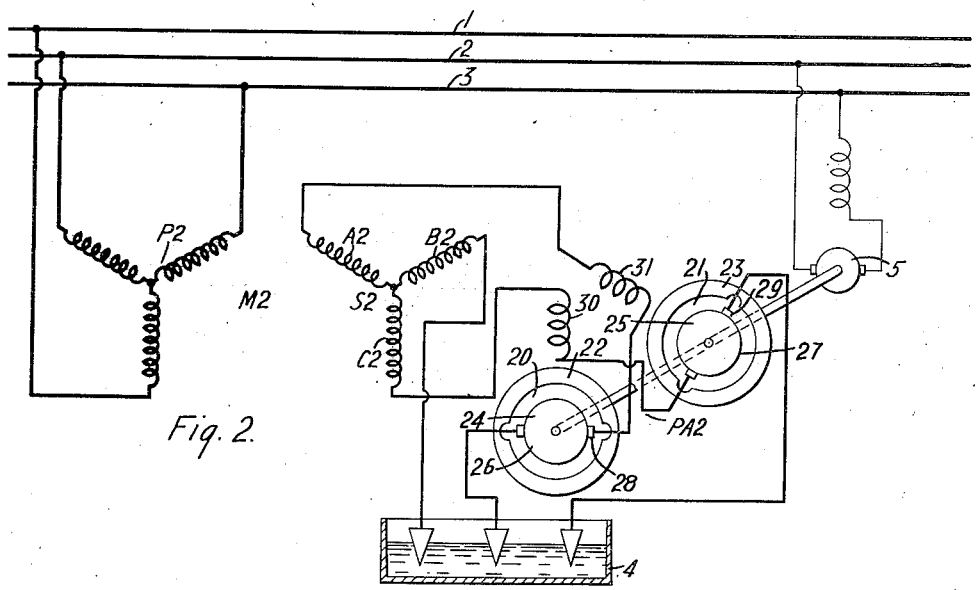
Figure 3:
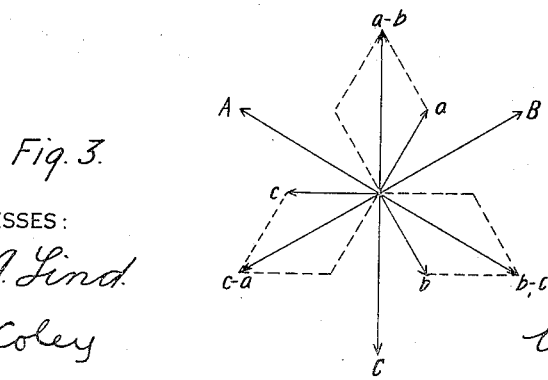

My invention may best be understood by reference to the accompanying drawing, in which Figure 1 is a diagrammatic view of a system embodying the preferred form of my invention; Fig. 2 is a similar view of a modification thereof, and Fig. 3 is a vector diagram showing the relationships of certain of the voltages developed in the systems of Fig. 1 and Fig. 2.

Referring to Fig. 1, the system shown comprises a plurality of supply-circuit conductors 1, 2 and 3 that are adapted to deliver polyphase alternating current energy to primary windings P1 of a polyphase induction motor M1 having secondary polyphase windings S1 which are connected to a polyphase interconnected governing rheostatic device 4 through a phase-advancer PA1 which is driven by means of a motor 5.

The polyphase induction motor M1 has its primary winding P1 connected in star, while its secondary windings S1 embody a plurality of star-connected phase windings A1, B1 and C1. My invention, however, is not restricted to any particular form of induction motor, and delta-connected machines may be advantageously regulated by my system.

The phase advancer PA1 is of the well-known Leblanc type, being provided with an unwound magnetizable core 7 and a single armature 7ª having separate and independent armature windings that are respectively connected to separate commutator cylinders 8 and 9 which coöperate with sets of brushes 10 and 11 that are disposed in quadrature relation, the one to the other. The armature 7ª of the phase advancer PA1 is operated by means of the driving motor 5 which may conveniently comprise a single-phase commutator machine having an armature 12 and a field-magnet winding 13 that are connected in series-circuit relation across a pair of supply-circuit conductors 2 and 3.

The armature winding that is associated with the set of brushes 10 is connected in series between the secondary phase winding C1 of the motor M1 and the rheostatic device 4, while the armature winding which is associated with the set of brushes 11 is similarly connected in series-circuit relation between the secondary phase winding A1 and the regulating rheostat 4. The other secondary phase winding B1 is directly connected to said rheostat.

The rheostatic device 4 may conveniently be a liquid rheostat embodying a plurality of electrodes 15 that are adapted for immersion in a body of electrolyte contained within a single tank 16, although any form of interconnected polyphase resistor may be employed.

Reference may now be had to Fig. 3 in which the vectors A, B and C respectively represent the currents flowing in the three secondary phase windings A1, B1 and C1 of the motor M1. In order to obtain phase or power-factor compensations, it is necessary to induce, in each of the phases, an electromotive force which is shifted 90° with respect to the current therein. These three electromotive forces are represented by the vectors $a$, $b$ and $c$.

The resultant corrective voltage between the extremities of the several phase windings is the vector sum of the voltages induced in the respective windings. Therefore, the combined induced voltage between the phase windings A1 and B1 is $a$—$b$, shown in Fig. 3, as will be understood. The vector sum of the induced voltages between B1 and C1 is $b$—$c$, while the resultant induced voltage between the terminals of the phase windings C1 and A1 is $c$—$a$.

It is evident that, instead of inducing a compensating voltage $a$ in the phase or leg A1, the voltage $b$ in the phase B1 and the voltage $c$ in the phase C1, it is possible to secure the desired results by inducing the resultant voltage $a$—$b$ in phase A1, $b$—$c$ in phase B1 and $c$—$a$ in phase C1.

Moreover, if found desirable, a compensating voltage $a$—$b$ might be induced in the phase A1 and a voltage $b$—$c$ in the phase C1, while no voltage is added to the phase B1. Under these conditions, the resultant voltage between the terminals of phases A1 and B1 is $a$—$b$, while the resultant voltage between the phases B1 and C1 is $b$—$c$, as required.

Obviously, the resultant voltage between the phases A1 and C1 is the vector sum of the voltage induced in these respective phases, namely, $a$—$b$ and $b$—$c$ which is represented by the vector $c$—$a$, as will be evident from Fig. 3. The voltage $c$—$a$, therefore, meets the required conditions for obtaining the desired phase compensation. It is manifest, therefore, that phase regulation and power-factor adjustments may be obtained in a machine having a three-phase secondary winding merely by adding the proper corrective voltages to two of the phases thereof.

In the system shown in Fig. 1, the voltage $a$—$b$ is induced across the set of brushes 11 by reason of the field that is developed by the current traversing the armature winding associated with the set of brushes 10 which is received from the phase C1, and this voltage is in phase therewith. Moreover, if the current from phase winding A1 traverses the armature winding associated with the set of brushes 11, an exciting field is produced in the armature which induces the proper corrective voltage $b$—$c$ between the set of brushes 10 which are included in circuit with the phase winding C1, since the voltage $b$—$c$ is in phase with the voltage of the phase winding A1.

Thus, a single-phase advancer having two independent armature windings serves to deliver the desired compensating voltages to a portion of the phase windings of a three-phase machine, whereby adjustments of power-factor or phase position may be readily obtained. Moreover, by reason of the independence of the several phase-advancer windings and their relation to the circuits of the motor secondary winding S1 and the polyphase interconnected regulating rheostat 4, the phase advancer may be employed to perform its intended function when the rheostat 4 is being employed as well as when it is entirely eliminated from circuit.

Reference may now be had to Fig. 2, in which the system shown comprises supply-circuit conductors 1, 2 and 3 which deliver energy to primary windings P2 of a polyphase induction motor M2, the secondary windings S2 of which comprise star-connected phase windings A2, B2 and C2, as set forth in connection with the system illustrated in Fig. 1.

The polyphase rheostatic device 4 and the driving motor 5 may also be similar to those already described, although the phase-advancing means PA2 differs therefrom, and, in lieu of comprising a single dynamo-electric unit, embodies a pair of separate and independent machines 20 and 21 severally having unwound magnetizable cores 22 and 23, armatures 24 and 25, armature windings (not shown) that are connected to commutator cylinders 26 and 27 and co-operating sets of brushes 28 and 29, as well as exciting field-magnet windings 30 and 31.

The exciting winding 30 of the machine 20 is connected in series circuit with the armature winding associated with the set of brushes 29 of the machine 21 between the phase winding C2 and the rheostatic device 4. The excitation of the machine 20, therefore, is in phase with the voltage of the phase winding C2.

The exciting winding 31 of the machine 21 is arranged in series-circuit relation with the armature winding that is associated with the set of brushes 28 of the machine 20 between the secondary phase winding A2 and rheostat 4. The machine 21, therefore, is excited in phase with the voltage of the secondary phase winding A2.

Thus, by reason of the cross connections of the exciting windings 30 and 31 of the machines 20 and 21, the corrective voltage that is added to that of phase winding A2, is induced between the brushes 28 of machine 20 and is in phase with the voltage of the phase winding C2 and may be represented by $a-b$, while $b-c$ represents the voltage that is added to the voltage of phase winding C2 and is induced across the brushes 29 of machine 21 by reason of the fact that its excitation is in phase with the voltage of the phase winding A2.

In this way, the proper compensating voltages are added to the voltages of two of the phase windings of the motors M2 and, therefore, the desired power-factor and phase adjustments may be obtained, as hereinbefore set forth.

Obviously, my invention is not restricted to the specific arrangement of circuit connections or details of construction of the apparatus shown and described, and various modifications therein may be effected without departing from the spirit and scope of my invention as set forth in the appended claims.

I claim as my invention:

1. In a system of control, the combination with a polyphase induction motor having primary and secondary windings, of phase-advancing means connected in circuit with a portion only of the secondary phase windings, said phase-advancing means producing component E. M. F.'s in the remaining secondary phase windings.

2. In a control system, the combination with an induction motor having primary windings and three-phase secondary windings, of phase-advancing means connected in circuit with only two of the secondary phase windings, components of E. M. F. produced in said phase-advancing means combining to produce a phase-advancing E. M. F. in the remaining secondary phase winding.

3. In a control system, the combination with an induction motor having polyphase primary and secondary windings, of electro-dynamic means so connected in circuit with a portion only of the secondary phase windings as to effect power-factor compensations in all phases of the motor.

4. In a control system, the combination with a polyphase induction motor having three-phase secondary windings, of electro-dynamic phase-advancing means embodying two separate armature windings respectively connected in circuit with two of the secondary phase windings of the motor, said windings producing corrective E. M. F.'s in their respectively associated phases and also producing component E. M. F.'s that combine to produce a corrective E. M. F. in the remaining phase.

5. In a control system, the combination with a polyphase induction motor having three-phase secondary windings, of electrodynamic phase-advancing means embodying a single armature and a plurality of separate and independent windings therefor respectively connected in circuit with two of the phase windings of said motor, said windings producing corrective E. M. F.'s in all phase-windings of said motor.

6. In a control system, the combination with a polyphase induction motor having three-phase secondary windings, of dynamo-electric phase-advancing means embodying two separate and independent magnetizing windings respectively connected in circuit with a portion of the secondary phase windings and each adapted to furnish the excitation for the other, said windings producing leading E. M. F.'s in all the phase-windings of said motor.

7. In a system of control, the combination with a polyphase induction motor having three-phase secondary windings, and a polyphase interconnected rheostatic device connected to the secondary windings for governing the operation of the motor, of dynamo-electric phase-advancing means connected in series circuit between only two of the secondary phase windings and the polyphase rheostatic device, and adapted to jointly produce a leading E. M. F. in the remaining phase-winding.

8. In a system of control, the combination with a polyphase induction motor having three-phase secondary windings and a polyphase interconnected rheostatic device connected to the secondary windings for governing the operation of the motor, of dynamo-electric phase-advancing means embodying a single armature and two separate armature windings respectively connected in series circuit between certain of said secondary phase windings and the rheostatic device, and adapted to produce leading E. M. F.'s in all the phase windings of said motor.

9. In a control system, the combination with a polyphase induction motor provided with a polyphase-wound secondary member, of phase-advancing means connected in circuit with a portion only of the phases of said secondary member, said phase-advancing means producing E. M. F.'s in the respectively associated phases of such phase and magnitude that each may be resolved into a quadrature-related leading component E. M. F. in the respectively associated phases of predetermined magnitude and into residual components which jointly produce in the remaining phases quadrature-related leading E. M. F.'s of like magnitude.

10. In a control system, the combination with a three-phase induction motor provided with a wound secondary member, of phase-advancing means connected in two phases of said secondary member and adapted to produce E. M. F.'s therein leading by substantially 60°, whereby there are produced quadrature-related leading components of E. M. F. in each phase of said secondary member.

11. The combination with a dynamo-electric machine of the induction type provided with a three-phase secondary winding, of means coupled to said machine and adapted to either absorb energy therefrom or to impart energy thereto, a control resistor, leads from the respective terminals of said secondary winding to said resistor, and means for producing phase-modifying electromotive forces in only two of said leads having a relative phase-displacement of 120°, whereby the triangle of secondary electromotive forces is displaced in position.

12. The combination with a dynamo-electric machine of the induction type provided with a three-phase secondary winding, of means coupled to said machine and adapted to either absorb energy therefrom or to impart energy thereto, a control resistor, leads from the respective terminals of said secondary winding to said resistor, an auxiliary dynamo-electric machine embodying armature windings and two commutators connected to said armature windings and having their brushes disposed in electrical quadrature, whereby transformer action between said windings is eliminated, each winding being disposed to cut the field of the other and to maintain a rotational electromotive force at its terminals proportional to said cutting, two of said leads traversing said armature windings, respectively, whereby phase-modifying electromotive forces having a relative phase-displacement of 120° are induced in said leads, and the triangle of electromotive forces of said secondary electromotive forces is displaced in one direction, and means for driving said auxiliary machine.

In testimony whereof, I have hereunto subscribed my name this 31st day of Aug. 1915.

RUDOLF E. HELLMUND.